United States Patent Office 2,830,094
Patented Apr. 8, 1958

2,830,094

HALOGENATED DERIVATIVES OF 8,13-DIMETHYL NUCLEARLY MONOUNSATURATED POLYHYDROPHENANTHRENE TERTIARY CARBINOLS AND PREPARATION THEREOF

Nicholas Thomas Farinacci, New York, N. Y.

No Drawing. Application September 18, 1956
Serial No. 610,624

15 Claims. (Cl. 260—617.5)

This invention relates to new compositions, the mono- and dihalide derivatives of nuclearly monounsaturated polyhydrophenanthrenes tertiary carbinols which halogenated derivatives having the structure

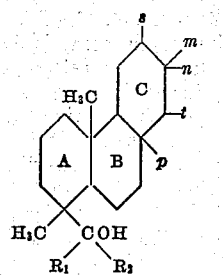

wherein the angular methyl and tertiary carbinol groups are in trans relationship, $R_1$ and $R_2$ are each selected from the group consisting of the alkyl and aryl radicals, at least one of the $s$, $m$, $t$ and $p$ groups is a halogen, $p$, $t$ and $s$ are selected from the group consisting of halogen and hydrogen, $m$ is selected from the group consisting of halogen, hydrogen and methyl and $n$ is selected from the group consisting of —$CH(CH_3)_2$, —$CH{=}CH_2$, —$CHOHCH_3$, —$CHOHCH_2OH$, and —$CHpCH_2t$ (wherein $p$ and $t$ are each selected from the group consisting of hydrogen and halogen and at least one of which is a halogen), and preparation, thereof.

It is an object of the invention to prepare products, which are intermediates for the manufacture of therapeutics, useful for the production, for example, of synthetic intermediates such as aceto-polyhydrophenanthrene tertiary diphenyl carbinols as in copending application Serial No. 198,895 (refiled as Ser. No. 428,852) all of which are useful for the preparation of such as 7-keto-2-aceto-polyhydrophenanthrenes as disclosed in copending application Serial No. 198,892 (refiled as Ser. No. 441,646, July 6, 1954, which is refiled as application Serial No. 610,625, September 18, 1956) to be useful, especially for treatment of disorders related with deficiencies of the seminal organs, testicular and pituitary glands.

It is a further object of the invention to produce intermediates suitable for the production of such as the natural cyclo-pentanopolyhydrophenanthrene hormones by first converting them to 2-carbonylated-7-ketoΔ(8,14) polyhydrophenanthrones and utilizing the latter for natural hormone production.

One object of this invention is the production of said halogenated tertiary carbinols by subjecting such as the Δ(7,8) and Δ(6,7) dihydro-levo-pimaryl diphenyl tertiary carbinols to the action of such as $Cl_2$, $Br_2$, HCl and HBr, preferably, in acetic acid or halogenated solvents such as chloroform and $CCl_4$, chlorinated alkanes, or in ether and alcohol.

Another object of this invention is to provide stable halogenated nuclearly saturated intermediates which are protected from degradation of the nucleus while suitably, oxidation may be effected at other positions of the halogenated compound, for example, at position 2, as in copending applications, Serial Nos. 428,852 and 441,646 (refiled as application Serial No. 610,625), for example, to further provide as disclosed in application Serial No. 441,646 (and Serial No. 610,625), the therein specified dehalogenated 13-methyl polyhydrophenanthrones of which certain members are found to possess androgenic activity.

Now in accordance with the invention a carbinol being nuclearly monounsaturated in the C-ring such as a dihydro-levo-pimaryl or d-pimaryl tertiary diphenyl carbinols made according to processes of copending application Serial No. 416,433 (refiled as application Serial No. 610,623) is dissolved in suitable solvents such as acetic acid, chloroform, carbon tetrachloride, halogenated alkanes or ether-alcohol and treated with a suitable amount of halogen or halogen hydride.

Suitably protected halogenated tertiary carbinols in the abietyl and d-pimaryl group of the phenanthryl series of compounds as are produced in accordance with the method of the invention are defined to include such ring saturated derivatives having the 8,13-dimethyl tricyclic ring structure and the general formula

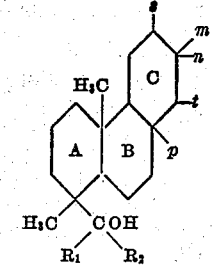

wherein $R_1$ and $R_2$ are each selected from the group consisting of the alkyl and aryl radicals, and the $p$, $t$ and $s$ are each selected from the group consisting of halogen and hydrogen, $m$ is selected from the group consisting of hydrogen, halogen and methyl and $n$ is selected from the group consisting of —$CH(CH_3)_2$, —$CH{=}CH_2$, —$CHOHCH_3$, —$CHOHCH_2OH$, and —$CHpCH_2t$ (wherein $p$ and $t$ are each selected from the group consisting of hydrogen and halogen and at least one of which is a halogen). Ring A is defined to have the substituents 8,13-dimethyl-8-tertiary $R_1$, $R_2$ carbinol.

Preferably, such as the 7,8-dibrom-dihydro-levopimaryl tertiary diphenyl carbinol (the nuclearly saturated 8,13-dimethyl 1,2-dibrom polyhydrophenanthrene-8-tertiary diphenyl carbinol) may be produced in high yield as by treatment of said tertiary carbinol dissolved in such as glacial acetic acid with at least one mole equivalent of such as $Br_2$ in acetic acid with stirring and cooling. We prefer to use chlorine, bromine, hydrogen chloride or hydrogen bromide and at a temperature in the range of about —25° C. to about 110° C., preferably, in the range of about 15° to about 35° C.

The process for producing halogenated tertiary carbinols as set forth herein and illustrated in examples below may provide suitably novel products of the invention herein.

The process is distinct from such processes which are unsuitable for the purposes of this invention, herein, such as the use of metallic catalysts, such as aluminum or aluminum halides which are utilized, for example, as in Borglin U. S. 2,050,979, for the conversion of unstable halogenated polyunsaturated diene rosin acids such as abietic to partially halogenated polymerized rubber-like unidentified products which have a commercial stability defined in terms of resistance to further loss of halogen on heat treatment. Such further treatment of the halogenated tertiary carbinols of the invention as set forth herein, such as practiced in Borglin is unnecessary since said halogenated tertiary carbinols of this invention are sufficiently stable for the purposes and novel utility of the related inventions set forth in copending applications Serial Nos. 198,892, 198,893, 198,895 and 441,646; 416,433, 428,852, 610,623, 610,625. Such treatment with metal catalyst tends to attack and destroy the tertiary hydroxyl of the subject tertiary carbinols.

The following examples serve to illustrate this invention without, however, limiting the same to them.

Example 1

2 grams of Δ (7,8) dihydro-levo-pimaryl tertiary diphenyl carbinol are dissolved in 100 cc. glacial acetic acid. To this solution is added at room temperature a solution of 0.75 gram bromine in 30 cc. glacial acetic acid while stirring and continued until the solution becomes practically colorless. The dibromide may be separated from the acetic acid by dilution with water and extraction with petroleum ether, $C_{32}H_{42}OBr_2$, percent Br 26.5, $n_D=1.5867$, $a_D=-8.4°$.

Example 2

1 gram of Δ (7,8) dihydro-levo-pimaryl tertiary diphenyl carbinol is dissolved in 50 cc. of carbon tetrachloride and treated dropwise at room temperature with 0.20 gram of chlorine dissolved in 25 cc. of carbon tetrachloride. The dichloride is recovered by evaporation of the carbon tetrachloride as a white residue, 13.8% Cl.

Example 3

2 grams of Δ (7,8) dihydro-levo-pimaryl tertiary diphenyl carbinol are dissolved in 100 cc. of a mixture of equal parts of ether and absolute ethanol. The solution is saturated with 20 grams of dry hydrochloric acid and allowed to stand for 1 to 2 days in the cold. The hydrochloride addition product having chlorine in the 7-position is recovered by evaporation and fractional crystallization, and contains 7.4% Cl.

Example 4

2 grams of 7-α-hydroxy-ethyl dextro-pimaryl tertiary diphenyl carbinol (prepared by stirring 6 grams of the d-pimaryl carbinol for 4 hours at about 0° C. with a 5% $H_2SO_4$ solution in 500 cc. of a 1:1 acetone-water mixture) are dissolved in 50 cc. ethylene dichloride and treated dropwise at room temperature with 1 gram of bromine dissolved in 25 cc. of carbon tetrachloride. The 11,1-dibrom-2,8,13-trimethyl-2-α-hydroxyethyl polyhydrophenanthrene-8-tertiary diphenyl carbinol is recovered by evaporation of solvent.

Example 5

2 grams of Δ (7,8) dihydrolevopimaryl tertiary dimethyl carbinol is treated as in Example 1, with 1 gram of bromine and the 1,2-dibrom-2-isopropyl-8,13-dimethyl polyhydrophenanthrene-8-tertiary dimethyl carbinol is extracted as in Example 1.

Example 6

2.5 grams of 7-glycol dextropimaryl tertiary diphenyl carbinol (prepared by stirring a mixture of 6 grams of the d-pimaryl carbinol for 3 hours at 0° to 5° C. with a 5% $KMnO_4$ solution in 500 cc. of 1:1 acetone-water) is dissolved in 1:1 ether-alcohol and saturated with dry HCl with standing for 2 days. A recovery of 11-chloro-2-glycol-2,8,13-trimethyl polyhydrophenanthrene-8-tertiary diphenyl carbinol therefrom is 2.8 grams.

The separation and isolation of the carbinol halides may be made not only in the manner described in examples, as by extracting the reaction mixture with suitable solvents and extracting or evaporating the latter, or by precipitating the compounds formed from their solutions by means of water or other organic solvents wherein they are insoluble, while by-products and impurities remained dissolved therein, but one may use other methods, for example, by making use of the selective solubility which non-polar solvents have for these halide derivatives of said tertiary carbinols. The purification of said products may be made by fractional or repeated crystallization, chromatography and the like.

Of course, the amounts of the various agents and the type and amounts of solvents used in carrying out this invention, the temperatures employed and other reaction conditions may be varied within limits obvious to those skilled in the art. Other halogen and mixed halogens such as IBr, ClF, and the like also may be used such as are described, for example, in Water's Physical Aspects of Organic Chemistry (1936 ed.), page 168, D. Van Nostrand Co., New York, N. Y. Hence, many other changes and variations may be used in accordance with the principles set forth herein and the claims annexed hereto.

The numbering in the ring system is defined to conform to that commonly used for the abietic series in Fieser and Campbell, Journal American Chem. Soc., 60, page 159 (1938), and in Fieser and Fieser, Natural Products Related to Phenanthrene, chap. II, 3rd ed., Reinhold Publishing Co., New York, N. Y. (1949).

The group of inventions comprised in the copending applications as noted below relates to converting the readily available pine resin acids to materials having androgenic activity, which materials may be further converted to natural cyclopentanopolyhydrophenanthrene type of hormones. They are described and claimed in copending applications Serial No. 416,433 (and serial No. 610,623), Serial No. 416,434 (and serial No. 610,624), Serial No. 428,852, Serial No. 441,646 (and Serial No. 610,625), and Serial No. 390,747 (and Serial No. 647,986).

In this overall process an ester derivative of a pine resin acid is converted to a tertiary carbinol by Grignard reaction.

In this connection there are included an improved method for high yields of carbinol of the order of 95% of theory by operation at elevated temperatures with high boiling solvents, and also a novel method of recovery of the high yield of desired carbinol products in substantially pure form by degradation and removal of the unreacted acid esters therefrom, and also a method for rearranging and dehydrating the tertiary carbinol product to corresponding tertiary diphenyl-methyl compounds. These novel features and intermediate compounds are described and claimed in copending application Serial No. 610,623, filed September 18, 1956, as a continuation-in-part of application Serial No. 416,433, filed March 15, 1954, as a continuation-in-part of application Serial No. 198,893, filed December 2, 1950, now abandoned.

The class of nuclearly monounsaturated tertiary carbinols obtained thereby are converted to corresponding saturated halides by halogenation or hydrohalogenation which features and carbinol halide products are described and claimed in present application filed September 18, 1956, as a continuation-in-part of application Serial No. 416,434, filed March 15, 1954, as a continuation-in-part of application Serial No. 198,894, filed December 2, 1950, now abandoned.

The resulting carbinol halides and the corresponding C-ring aromatized tertiary carbinols (obtained as above from the corresponding aromatized pine resin acids) are subjected to selective oxidation which converts the 2-side chain of the polyhydrophenanthrene tertiary carbinol to an alpha carbonyl group, which features and carbinol products are described and claimed in application Serial No. 428,852, filed May 10, 1954, as a continuation-in-part of application Serial No. 198,895, filed December 2, 1950, now abandoned.

The carbinol in the material obtained by any of the above discussed methods is rearranged and dehydrated to provide a tertiary diphenyl methyl compound, an (8, 14) unsaturated double bond is formed by removal of elements of water from the rearranged carbinol and the resulting compounds are oxidized on the active methylene group thereby formed which is adjacent to the said tertiary diphenyl methyl group, to provide the corresponding alpha-beta unsaturated 7-keto polyhydrophenanthrene compounds, which are shown to have androgenic and anabolic activities, which features and compounds are described and claimed in the application Serial No. 610,625, filed September 18, 1956, as a continuation-in-part of application Serial No. 441,646, filed July 6, 1954, which is a continuation-in-part of application Serial No. 198,892, filed December 2, 1950, now abandoned.

In the oxidation step, there are obtained as side products corresponding polyhydronaphthone propionic acids and lactones, and these may be converted to the corresponding above mentioned 7-keto polyhydrophenanthrene compounds by treatment with an acetylating agent as by treatment with phenyl acetate-sodium hydride reagent (or with methyl halide magnesium salts) which features and intermediate polyhydronaphthalene compounds are described and claimed in copending application Serial No. 647,986, filed March 25, 1957, as a continuation in part of Serial No. 390,747, filed November 6, 1953, as a continuation-in-part of application Serial No. 260,231, filed June 6, 1951, now abandoned.

The above mentioned 7-keto polyhydrophenanthrenes may be converted to suitable corresponding acetic or propionic acid ester derivatives which may be cyclyzed to corresponding known cyclopentanopolyhydrophenanthrene hormone intermediates, which may be converted by well known methods to natural steroid harmones.

In these fields, two types of nomenclature and numbering are established, (1) in terms of the structural isomers of the abietyl and d-pimaryl types wherein the tricyclic numbering is shown in the formulas given as carbon skeletons

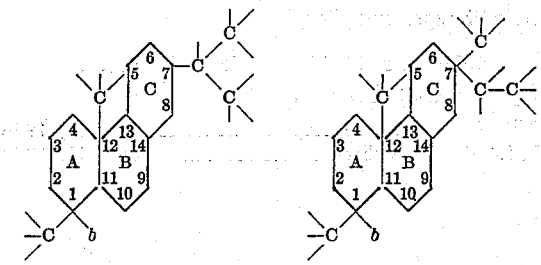

wherein b is a tertiarily bound group such as

—COOR, —COHPh$_2$

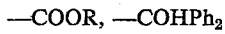

and —CH$_2$OH, —CH$_2$NH$_2$, wherein R and Ph have the definition defined herein and (2) in terms of a polyhydrophenanthrene nomenclature and numbering, wherein the tricyclic numbering is as shown in the same carbon skeletons, as shown in the formula below, both of which are

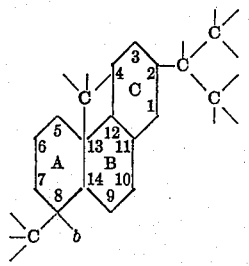

used herein, to conform with both as used in Fieser and Fieser, Natural Products Related to Phenanthrene, chap. 2, 3rd ed., Reinhold Publ. Co., N. Y., see pp. 41, 64 and 85, thereof, particularly.

This application is a continuation-in-part of my copending application Serial No. 416,434, filed March 15, 1954, based on application Serial No. 198,894, filed December 2, 1950, and now both abandoned in favor, hereof.

The preparations of starting materials for this invention are described in applications Serial Nos. 198,892, 198,893, 198,894 and 198,895, filed simultaneously December 2, 1950, and incorporated in refiled applications based thereon Serial Nos. 416,433, 416,434, filed March 15, 1954, and 428,852, 441,646, filed May 10, 1954, and July 6, 1954, respectively, and in applications Serial Nos. 610,623 and 610,625, filed September 18, 1956, which descriptions and relevant disclosures are hereby incorporated herein. (Applications Serial Numbers 198,892, 198,893, 198,894, 198,895, 416,433, 416,434, 441,646 and 390,747 are now abandoned.)

The material prepared in accordance with this case is used in the preparation of other starting materials as set forth in applications Serial Nos. 198,892; 198,893; 198,894; 198,895; 416,433; 416,434; 428,852 and 441,646 and in application Serial Nos. 610,623 and 610,625 which descriptions and relevant disclosures as set forth in said cases are hereby incorporated, herein.

What I claim is:

1. A process for the production of a halogenated 8-13-dimethyl polyhydrophenanthrene-8-tertiary carbinol having at least one and at most two nuclear halogen substituents and having as said 8-tertiary carbinol substituent, —COHR$_1$R$_2$, wherein R$_1$ and R$_2$ are each a member of the group consisting of an alkyl and an aryl hydrocarbon radical and having as a 2-substituent a member of the group of —CH(CH$_3$)$_2$, —CH=CH$_2$,

—CHOHCH$_3$ and —CHOHCH$_2$OH radicals, wherein the 13-angular methyl and 8-tertiary carbinol groups are in trans relationship and the phenanthrene nucleus having at most one halogen-free aromatic ring said aromatic ring being the C-ring and said nuclear halogen substituents being located in the non-aromatic B- and C-rings of the structural skeleton.

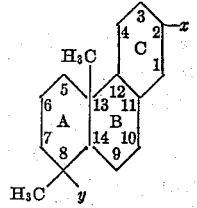

wherein y represents said 8-tertiary carbinol group and x represents said 2-substituents, from a corresponding carbinol reactant having one ethylenic double bond and at most one aromatic ring, said double bond being located in the B- and C-rings and said aromatic ring being the C-ring of said structural skeleton, which process comprises subjecting a mixture of said carbinol reactant and a halogen containing addition-reaction agent said agent being a member of the group consisting of a halogen and a hydrogen halide, to a temperature in the range above about 0° to below about 110° C., whereby the desired carbinol halide is produced.

2. A process of claim 1, wherein the halogen-containing agent is a hydrogen halide.

3. A process of claim 1, wherein the halogen-containing agent is hydrogen chloride.

4. A process of claim 1, wherein the halogen-containing agent is a halogen.

5. A process of claim 1, wherein the halogen-containing agent is bromine.

6. An 8,13-dimethyl polyhydrophenanthrene-8-tertiary carbinol having as said 8-carbinol substituent,

—COHR$_1$R$_2$ wherein R$_1$ and R$_2$ are each a member of the group consisting of an alkyl and an aryl hydrocarbon radical and having as a 2-substituent a member of the group of —CH(CH₃)₂, —CH=CH₂, —CHOHCH₃ and
—CHOHCH₂OH
radicals, and having at least one and at most two halogen atoms in the nucleus located in non-aromatic B and C rings of the structural skeleton

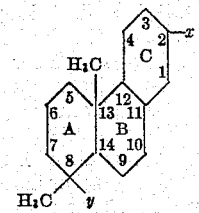

wherein y represents said 8-tertiary carbinol group and x represents said 2-substituent and the phenanthrene nucleus having at most one halogen-free aromatic ring said aromatic ring being the C-ring and wherein the 13-angular methyl and 8-tertiary carbinol groups are in trans relationship.

7. A carbinol of claim 6, wherein the nucleus is saturated.

8. A carbinol of claim 6, having an isopropyl group as a 2-substituent.

9. A carbinol of claim 6, having a tertiary diphenyl carbinol group as an 8-substituent.

10. A carbinol of claim 9, having a 2-isopropyl substituent.

11. A carbinol having a formula

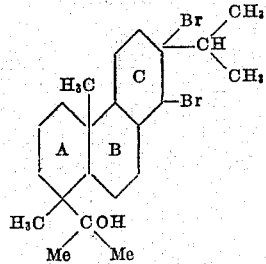

wherein Me represents methyl.

12. A carbinol having a formula

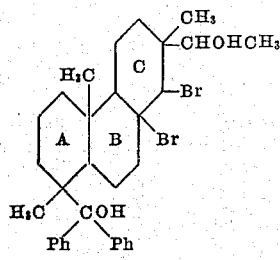

wherein Ph represents phenyl.

13. A carbinol having a formula

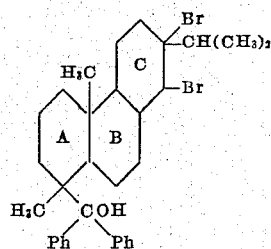

wherein Ph represents phenyl.

14. A carbinol having a formula

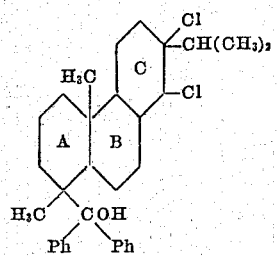

wherein Ph represents phenyl.

15. A carbinol having a formula

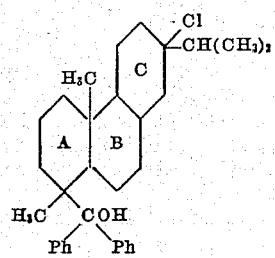

wherein Ph represents phenyl.

References Cited in the file of this patent
UNITED STATES PATENTS

| | | |
|---|---|---|
| 2,050,979 | Borglin | Aug. 11, 1936 |
| 2,781,400 | Jacobsen | Feb. 12, 1957 |